(No Model.)
E. FERNANDEZ.
MARINE VELOCIPEDE.
No. 537,921. Patented Apr. 23, 1895.
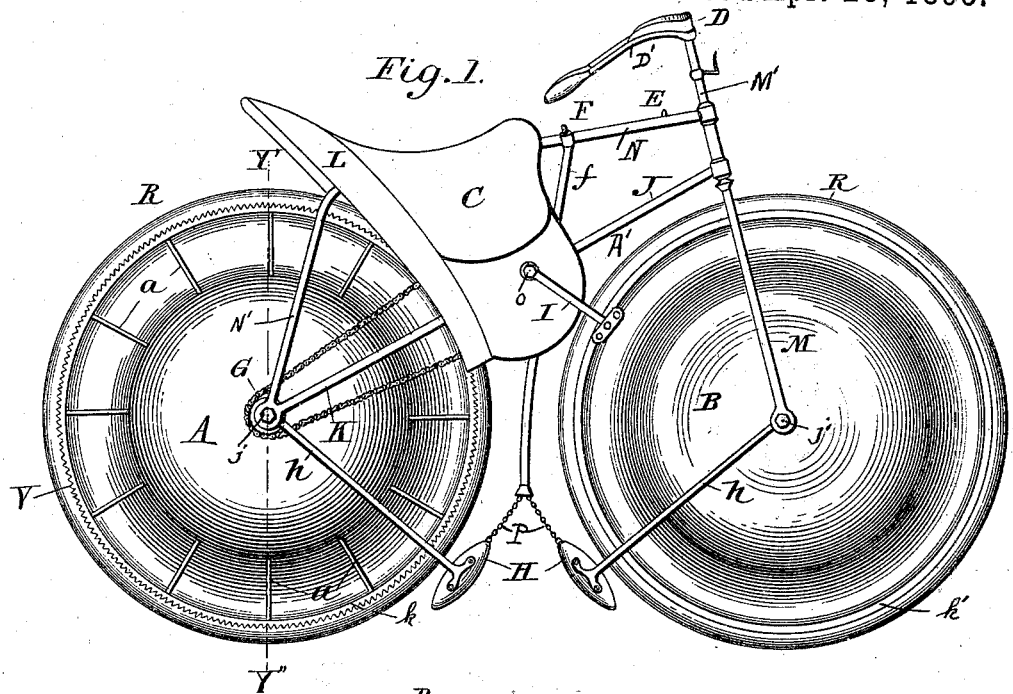
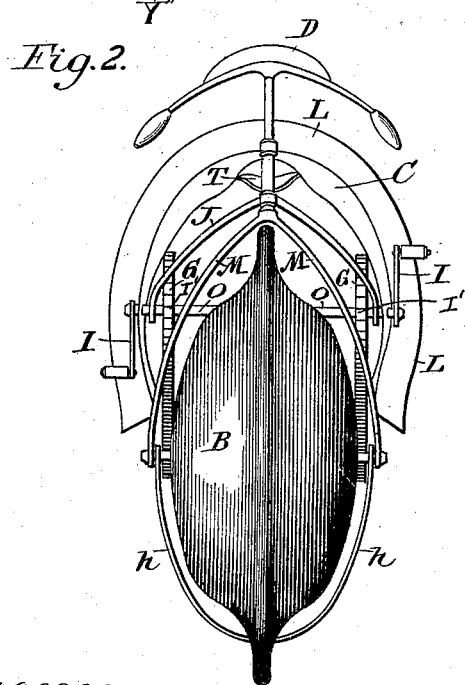
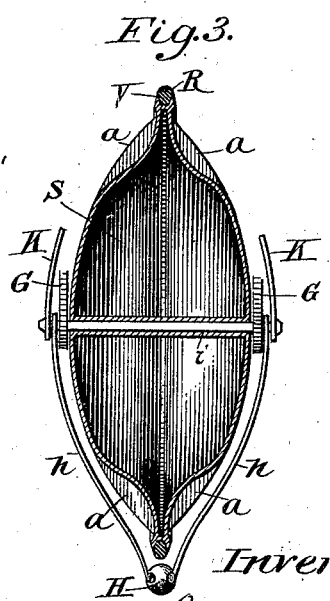
Witnesses:
Inventor:
Evaristo Fernandez

UNITED STATES PATENT OFFICE.

EVARISTO FERNANDEZ, OF NEW ORLEANS, LOUISIANA.

MARINE VELOCIPEDE.

SPECIFICATION forming part of Letters Patent No. 537,921, dated April 23, 1895.

Application filed November 18, 1893. Serial No. 491,358. (No model.)

*To all whom it may concern:*

Be it known that I, EVARISTO FERNANDEZ, a subject of the King of Spain, residing at New Orleans, in the parish of Orleans and State of Louisiana, have invented certain new and useful Improvements in Bicycles; and I do declare the following to be a full, clear, and exact description of the invention, such as will enable others skilled in the art to which it appertains to make and use the same.

My invention relates to improvements in bicycles; and it has for its object to provide a bicycle embodying such a construction that it is adapted to travel with equal facility on land, on ice, and in the water.

Other objects and advantages of the invention will be fully understood from the following description and claims when taken in connection with the annexed drawings, in which—

Figure 1, is a side elevation of my improved bicycle. Fig. 2, is a front elevation, and Fig. 3, is a vertical, transverse section taken in the plane indicated by the line $y', y''$, of Fig. 1.

Referring by letter to said drawings:—A', indicates the main frame of my improved bicycle which preferably comprises the bar N, which is forked at its rear end as shown at N', and the bar J, which has its rear portion forked as shown at K.

M', indicates the turning-head which is journaled in the forward ends of the frame bars J, N, and has its lower end forked as shown at M, and its upper end provided with the usual handle D', upon which is fixed a tray D, for parcels or the like, and A, B, respectively, indicate the rear and forward buoyant wheels. These wheels A, B, are made of copper or other suitable material, preferably in the form shown, and they are provided with central passages $i$, to receive the axles $j, j'$, and with the fellies $k, k'$, to receive the rubber tires R. The rear wheel A, is designed to be employed as the drive wheel and it is therefore provided on its sides with lateral blades as $a$, designed to engage the water when the bicycle is used in the same, and has its felly toothed as indicated by V, so as to enable it to take hold on the ice when the rubber tire R, which is only designed for land use, is removed.

H, indicates weights which are designed and adapted to hold the bicycle in an upright position when it is used in the water. These weights H, are connected by suitable bails $h$, to the wheel axles $j, j'$, and when in use they are designed to hang loosely beneath the wheels in the manner shown in Fig. 3, so as to render the lower portion of the machine heavier than the upper portion and thereby prevent the machine from capsizing. When the bicycle is in use on land it is necessary to hold the weights H, in a raised position as shown in Fig. 1, and for this purpose, I employ the chains P. These chains P, take loosely through a tube $f$, which is connected to and depends from the frame bars J, N, and they are designed, when the weights are raised, to be placed in engagement with a stop or pin F, on the bar N, so as to hold the weights in their raised position.

O, indicates the shaft of the machine. This shaft is journaled in the branches K, of the bar J, and it is provided with pedal cranks I, and is also provided with sprocket wheels I', which are connected by chains as G, with sprocket wheels on the axle $j$, of the wheel A, whereby it will be seen that when the crank shaft is turned by the rider, the wheel A, will also be turned and the machine consequently propelled forward.

C, indicates the saddle of the machine which is preferably made in the form shown in order to prevent the water from splashing up against the rider when the machine is used in the water. This saddle C, has its forward portion connected to the bar N, and its rear portion mounted on a spring T, connected to said bar, and it is provided at its rear end with a lateral mud and water guard L, which may be made of any material suitable to the purpose.

When the machine is used in the water, it is often desirable to hold the front wheel, which has its axle mounted in the fork of the turning head M', in alignment with the rear driving wheel; and to this end I provide the slidable latch E, which is mounted on the frame bar N, and is designed to engage a notch or seat, (not illustrated) in the head M', so as to prevent the same and consequently the wheel from turning. The said latch E, may be readily moved out of engagement with the turning head M', and it will therefore not interfere with the machine being used in the ordinary manner on land or ice.

I have in some respects specifically described the construction and relative arrangement of my improved machine in order to impart a full and exact understanding of the same, but I do not desire to be understood as confining myself to such construction and arrangement as such changes or modifications may be made in practice as fairly fall within the scope of my invention.

Having described my invention, what I claim is—

1. In a bicycle, the combination with a frame and a buoyant wheel mounted on an axle arranged in the frame; of a bail straddling the buoyant wheel and loosely connected at its ends to the axle thereof, a weight carried by the bail and adapted to rest beneath the buoyant wheel, and a suitable means for holding the weight in a raised position, substantially as and for the purpose set forth.

2. The bicycle described comprising the frame provided with the depending tube $f$, and with the stop F, the buoyant wheels mounted on axles arranged in the frame and having fellies provided with teeth V, and also having removable tires seated in the fellies, bails straddling the buoyant wheels and loosely connected at their ends to the axles thereof, weights carried by the bails and adapted to rest beneath the buoyant wheels, the chains connected to the weights and extending through the tube $f$, and adapted when the weights are raised to be placed in engagement with the stop F, on the frame so as to hold the weights in their raised position, and the saddle C, mounted on the frame and having the lateral mud and water guard L, at its rear end, all substantially as and for the purpose set forth.

EVARISTO FERNANDEZ.

Witnesses:
ALF. P. THÉARD,
C. J. ESTEVA.